(12) United States Patent
Azibert et al.

(10) Patent No.: US 8,720,899 B2
(45) Date of Patent: *May 13, 2014

(54) DYNAMIC SEALING

(75) Inventors: Henri Azibert, Windham, NH (US);
Steven Bernoth, Billerica, MA (US)

(73) Assignee: A.W. Chesterton Company, Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/335,235

(22) Filed: Dec. 22, 2011

(65) Prior Publication Data

US 2012/0242044 A1    Sep. 27, 2012

Related U.S. Application Data

(63) Continuation of application No. 12/039,208, filed on Feb. 28, 2008, now Pat. No. 8,083,235.

(51) Int. Cl.
*F16J 15/54* (2006.01)

(52) U.S. Cl.
USPC .......................................... 277/349; 277/371

(58) Field of Classification Search
USPC .......... 277/349, 371, 390, 422, 500, 505, 580
See application file for complete search history.

(56) References Cited

U.S. PATENT DOCUMENTS

| | | | |
|---|---|---|---|
| 3,434,727 A | 3/1969 | Kollenberger et al. | |
| 3,726,531 A | 4/1973 | Pagan et al. | |
| 4,889,349 A | 12/1989 | Müller | |
| 4,984,811 A | 1/1991 | Kuwabara et al. | |
| 5,039,115 A | 8/1991 | Hebert et al. | |
| 5,040,804 A | 8/1991 | Back | |
| 5,217,232 A | 6/1993 | Makhobey | |
| 5,738,356 A | 4/1998 | Marshall | |
| 6,231,048 B1 | 5/2001 | McNally, Jr. | |
| 6,431,553 B1 | 8/2002 | Amaral et al. | |
| 6,457,720 B1 | 10/2002 | London | |
| 6,814,355 B2 | 11/2004 | Bjornson | |
| 7,097,176 B2 | 8/2006 | Azibert | |
| 7,708,283 B2 | 5/2010 | Azibert et al. | |
| 2001/0010416 A1 | 8/2001 | Wu et al. | |
| 2002/0089123 A1 | 7/2002 | Azibert | |
| 2002/0096835 A1 | 7/2002 | Azibert et al. | |
| 2002/0175475 A1 | 11/2002 | Grimanis et al. | |
| 2003/0042681 A1 | 3/2003 | Takahashi | |
| 2004/0169336 A1 | 9/2004 | Azibert et al. | |
| 2004/0227297 A1 | 11/2004 | Azibert | |

(Continued)

FOREIGN PATENT DOCUMENTS

| | | |
|---|---|---|
| EP | 0 385 635 | 2/1990 |
| EP | 0 472 929 | 3/1992 |
| JP | 07151236 A | 6/1995 |

OTHER PUBLICATIONS

Coppenheaver, Brian R. "Notification of Transmittal of the International Search Report and the Written Opinion of the International Searching Authority, or the Declaration", International Application No. PCT/US2009/035447, mailed Jun. 1, 2009 (7 pages).

(Continued)

*Primary Examiner* — Vishal Patel
(74) *Attorney, Agent, or Firm* — Fish & Richardson P.C.

(57) ABSTRACT

A dual seal accommodates radial and axial movement, and accommodates positive and negative pressure differentials, when in sealing engagement about a rotating shaft.

15 Claims, 8 Drawing Sheets

(56) References Cited

U.S. PATENT DOCUMENTS

2004/0227298 A1 11/2004 Azibert
2005/0242516 A1 11/2005 Azibert et al.
2006/0006605 A1 1/2006 Grimanis et al.
2007/0090605 A1 4/2007 Grimanis et al.
2007/0241514 A1 10/2007 Orlowski et al.

OTHER PUBLICATIONS

EP Supplementary Search Report; EP 09 71 4680; Jul. 24, 2013; X. Revilla; 3 pp.

DYNAMIC SEALING

CROSS-REFERENCE TO RELATED APPLICATIONS

This application is a continuation application and claims the benefit of priority under 35 U.S.C. 120 of U.S. application Ser. No. 12/039,208, filed on Feb. 28, 2008 now U.S. Pat. No. 8,083,235. The disclosure of the prior application is considered part of and is incorporated by reference in the disclosure of this application.

TECHNICAL FIELD

This invention relates to seals, particularly to dual seals.

BACKGROUND

Seals are employed in a wide variety of mechanical apparatuses to provide pressure-tight and fluid-tight sealing. The seal is often positioned about a rotating shaft extending from a stationary housing. The seal may be bolted to the housing at the shaft exit, to restrict the loss of pressurized fluid from the housing. In other situations, the seal may be designed or adjusted to permit a controlled flow of fluid.

SUMMARY

A dual seal as described herein accommodates radial and axial movement, and accommodates positive and negative pressure differentials, when in sealing engagement about a rotating shaft.

In some embodiments, dual seals as illustrated herein include a sealing element, a balancing element, and an adapter disposed within an interior cavity of a gland housing. The gland housing can provide a bidirectional seal between an interior region of a vessel and a barrier fluid cavity. The sealing element can compensate for lateral movement of the shaft, and/or for variations in shaft radius, by moving radially relative to an axis of the seal. Thermal effects can cause axial expansion or contraction of the sealing element relative to the gland housing, e.g. when the sealing element and the gland housing are made of materials with different coefficients of thermal expansion. The balancing element can move axially to compensate for such thermal expansion or contraction of the sealing element. The seal can be configured such that axial movement of the balancing element maintains sealing contact between the balancing element and the sealing element, e.g., while continuing to allow the radial movement of the sealing element, as the sealing element expands and contracts.

In one aspect, seals configured to extend circumferentially about a shaft include: a housing defining an interior cavity open towards a central axis of the seal; a sealing element configured to move radially within the interior cavity in a manner to maintain sealing contact, the sealing element disposed within the interior cavity of the housing; a first seal disposed between the sealing element and the housing, the first seal maintaining sealing contact to limit fluid flow between the sealing element and the housing; a first element configured to move axially within the interior cavity in a manner to maintain sealing contact, the first element disposed within the interior cavity of the housing; a second seal disposed between the first element and the sealing element, the second seal maintaining sealing contact to limit fluid flow between the sealing element and the first element during radial motion of the sealing element relative to the first element; a biasing member disposed in contact with the first element, the biasing member configured to bias the first element towards sealing contact with the sealing element such that first element and the second seal maintain sealing contact during axial movement of an end face of the sealing element; and a third seal disposed between the first element and the housing, the third seal maintaining sealing contact to limit fluid flow between the housing and the first element. Embodiments can include one or more of the following features.

In some embodiments, seals also include a second element disposed between the first element and the housing and the third seal is disposed in a third seal cavity mutually defined by the first element and the second element. In some cases, the third seal is disposed to limit fluid flow between a first portion of the cavity in fluid communication with a first fluid reservoir at a first pressure and a second portion of the cavity in fluid communication with a second fluid reservoir at a second pressure.

In some cases, a pressure differential between the first pressure and the second pressure, taken across the third seal, biases the first element towards the sealing element when the first pressure is relatively greater (i.e., when the first pressure is greater than the second pressure) and also biases the first element towards the sealing element when the second pressure is relatively greater (i.e., when the second pressure is greater than the first pressure). The third seal can be operable to move axially in the third seal cavity in response to a pressure differential between the first pressure and the second pressure. For example, the third seal can be operable to move axially in the third seal cavity in response to the pressure differential with the third seal being urged toward a first position when the first pressure is relatively greater and toward a second position when the first pressure is relatively less.

In some embodiments, the third seal comprises an o-ring.

In some embodiments, the sealing element includes: a sealing element body; a plurality of first land protrusions integrally formed with and extending from the sealing element body; and a plurality of second lip protrusions integrally formed with and extending from the sealing element body. The second lip protrusions can be biased towards a position in which the second lip protrusions extend relatively further from the body than the first land protrusions. In some cases, each second protrusion defines a resilient ridge positioned for deflection by contact with an annular member inserted into the sealing member. In some cases, the second lip protrusions are arranged in pairs with a first pair of the second lip protrusions having tips deflected towards a second pair of the second lip protrusions, the second pair of protrusions having tips deflected towards the first pair of the second lip protrusions, and a third pair of second lip protrusions having tips deflected away from the first pair and second pair of second lip protrusions.

In some cases, a first end of the annular member defines a first beveled surface disposed between a radially extending end surface of the annular member and a second beveled surface, the second beveled surface disposed between the first beveled surface and an axially extending outer surface of the annular member. The first beveled surface can extend at an angle between 155 and 165 degrees relative to the axially extending outer surface of the annular member and the second beveled surface can extend at an angle between 165 and 175 degrees relative to the axially extending outer surface of the annular member.

In some cases, the first land protrusions are relatively less flexible than the second lip protrusions.

In some embodiments, seals also include a pin extending from the housing into a bore defined in the sealing element to limit rotation of the sealing element relative to the housing while allowing radial motion of the sealing element within the housing.

In some embodiments, the seal can comprise a split seal.

In another aspect, seals configured to extend circumferentially about a shaft include: an annular housing defining a cavity open towards a central axis of the seal; and a sealing element disposed at least partially within the cavity, the sealing element moveable radially within the cavity; wherein the sealing element comprises: a sealing element body; a plurality of first land protrusions integrally formed with and extending from the sealing element body; and a plurality of second lip protrusions integrally formed with and extending from the sealing element body, the second lip protrusions being biased towards a position to extend relatively further from the sealing element body than the first land protrusions. Embodiments can include one or more of the following features.

In some embodiments, each of the second lip protrusions defines a resilient ridge, positioned for deflection by contact with an annular member inserted into the sealing member. In some cases, the second lip protrusions are arranged in pairs with a first pair of the second lip protrusions having tips deflected towards a second pair of the second lip protrusions, the second pair of second lip protrusions having tips deflected towards the first pair of the second lip protrusions, and a third pair of second lip protrusions having tips deflected away from the first pair and the second pair of second lip protrusions.

In some embodiments, seals also include a pin extending from the housing into a bore defined in the sealing element to limit rotation of the sealing element relative to the housing while allowing radial motion of the sealing element within the housing.

In another aspect, methods of sealing about a rotating shaft include: positioning a seal housing about the shaft; disposing a circumferential sealing element in a seal housing cavity open towards the shaft, with the sealing element mounted to maintain sealing contact during radial movement of the sealing element within the cavity, while limiting fluid flow along an outer surface of the shaft; and disposing a circumferential first element in the seal housing cavity, with the first element mounted to maintain sealing contact during axial movement of the first element within the cavity, while limiting fluid flow along an outer surface of the shaft. Embodiments can include one or more of the following features.

In some embodiments, methods also include biasing the first element towards sealing contact with the sealing element using a biasing member.

In some embodiments, methods also include: providing a first pair of lip seals and a second pair of lip seals integrally formed with and extending from a base of the sealing element; and applying a pressurized fluid between the first and second pair of lip seals.

In some embodiments, methods also include: providing the sealing element with an annular body and multiple lip seals integrally formed with and extending radially inward from the body. In some cases, methods also include: engaging one of the lip seals with a first beveled surface of an annular member disposed about the shaft; and bending the one of the lip seals towards a direction from which the shaft is inserted through the sealing element.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
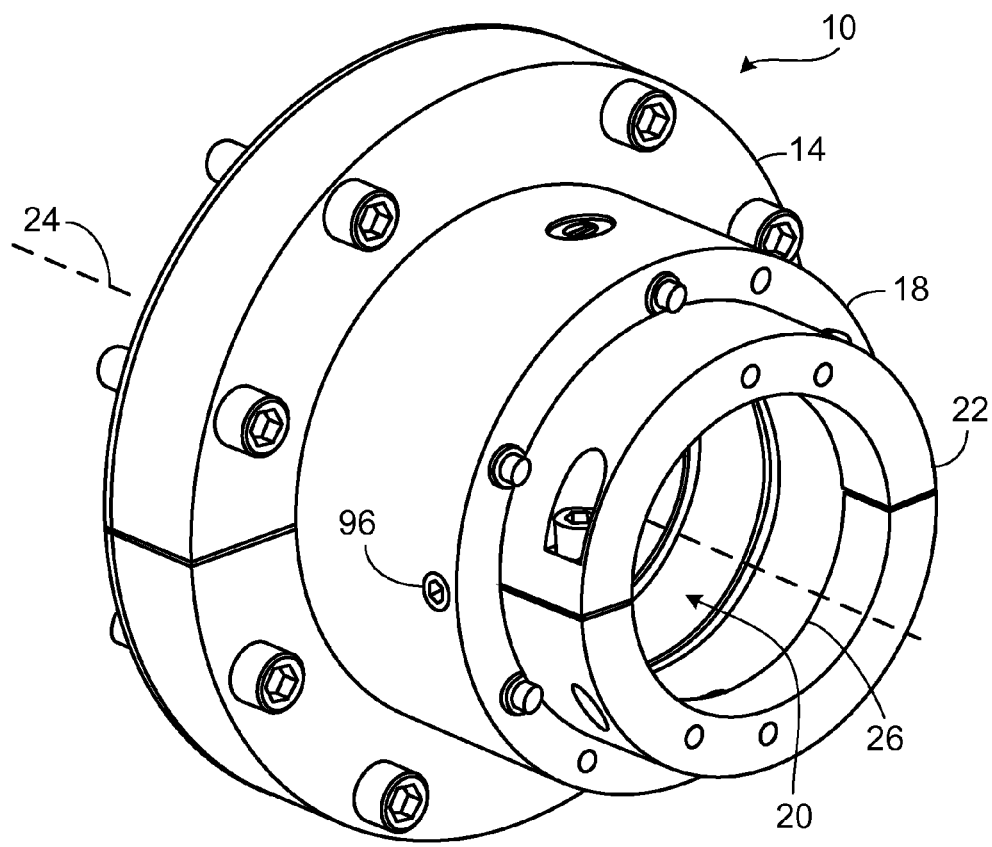
FIG. 1 is a perspective view of a dual seal.

In FIG. 1, a seal 10 is configured to be positioned about a rotating shaft (not shown). Seal 10 includes a housing clamp 14 and a gland housing 18 which together form an annular mount to position and support other components of seal 10. Housing clamp 14 can be used to attach seal 10 to a surface (e.g., the wall of a process vessel) through which the shaft extends. Housing clamp 14 engages, and holds in position, gland housing 18. Gland housing 18 defines an interior cavity 20 open towards a central axis 24 of seal 10. (As used herein, the term "axially" indicates a direction generally along the axis 24 of seal 10 and the term "radially" indicates a direction generally perpendicular to axis 24 of seal 10. Similarly, "inward" and "inner" are used to indicate towards or generally closer to the axis and "outward" and "outer" are used to indicate away from or generally further from the axis.)

Seal 10 also includes a sealing element, a balancing element, and an adapter disposed within interior cavity 20, as discussed below. A lock ring 22 is configured to hold a seal sleeve 26 in position about the shaft with seal sleeve 26 extending into an interior cavity 20 defined by housing clamp 14 and gland housing 18. Seal sleeve 26 and a lock ring 22 are mounted upon and rotate with the shaft.

Figure 2A:
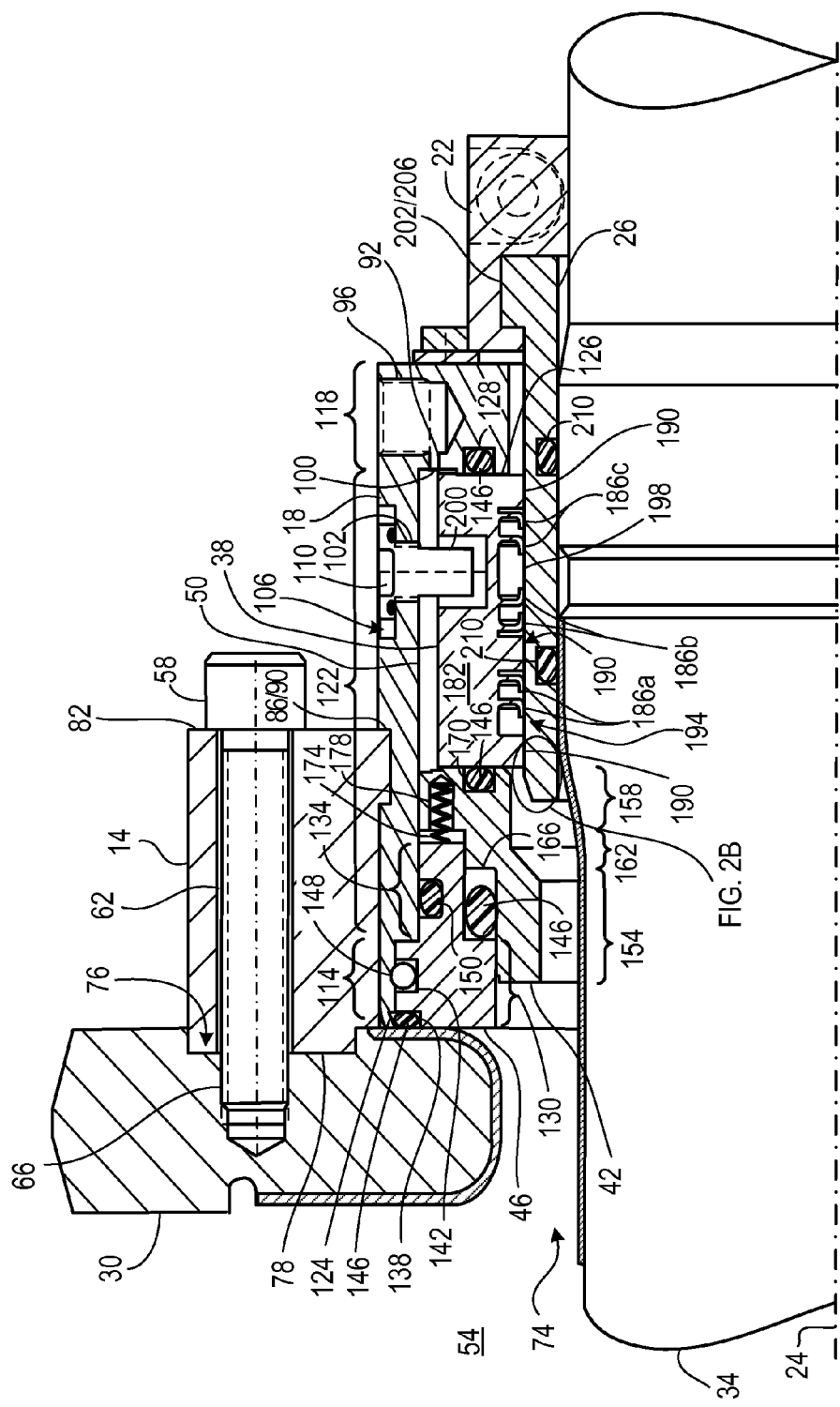
FIGS. 2A and 2B are a cross-sectional view of the seal of FIG. 1 mounted about a shaft with barrier fluid pressure greater than process pressure and an enlarged view of a portion of the seal shown in FIG. 2A, respectively.
Figure 2B:
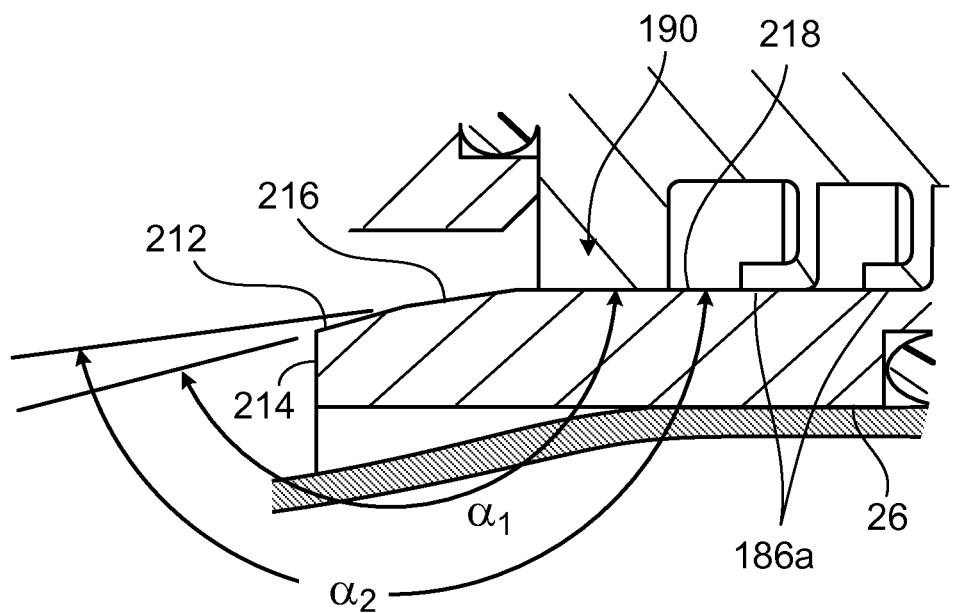
Figure 2C:
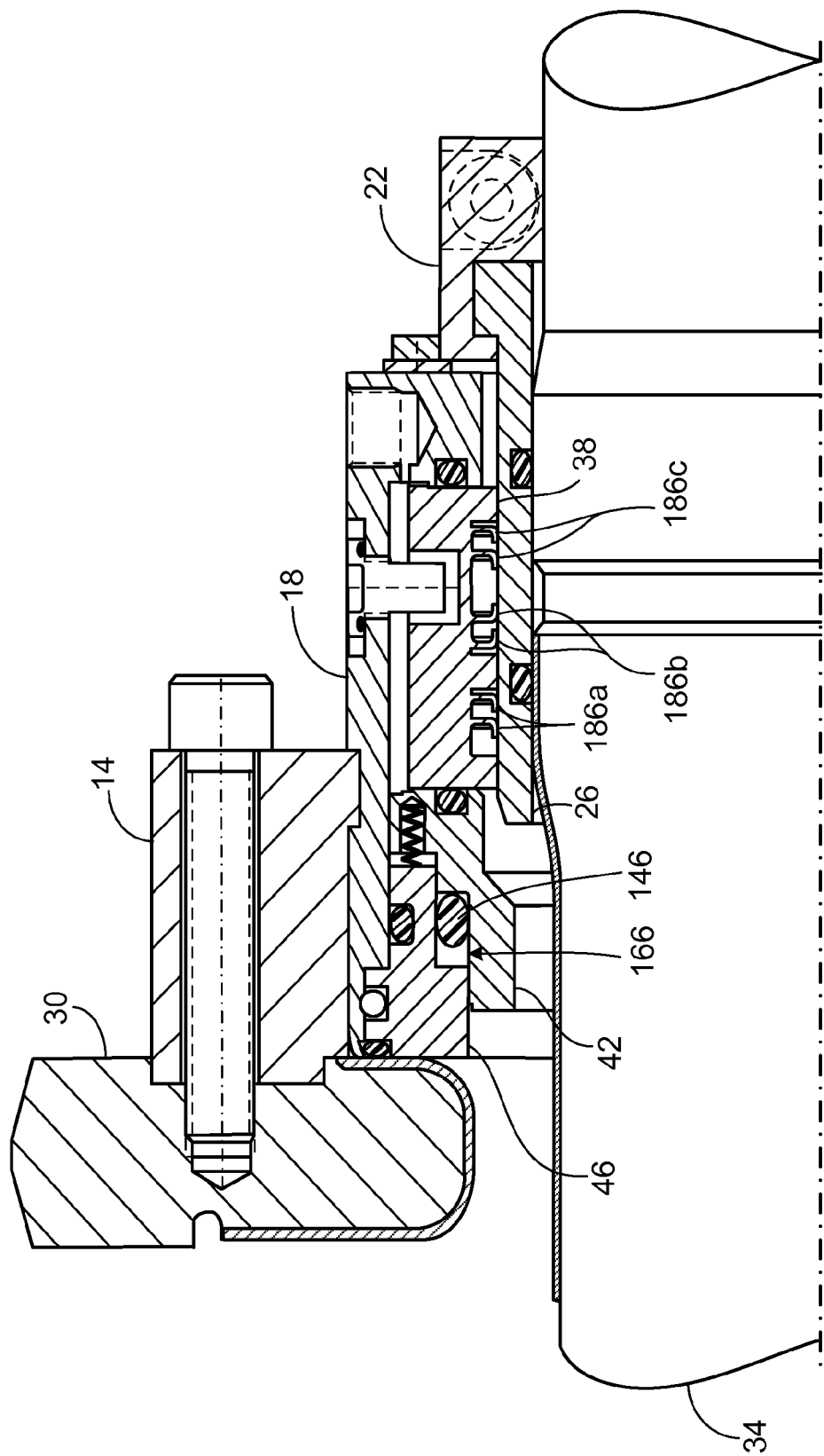
FIG. 2C is a cross-sectional views of the seal of FIG. 1 mounted about a shaft with barrier fluid pressure less than process pressure, respectively.

In FIGS. 2A, 2B, and 2C, seal 10 is mounted to a wall 30 of a process vessel to limit fluid flow along shaft 34 which extends through wall 30 of the process vessel. Sealing element 38, balancing element 42, and adapter 46 are disposed within interior cavity 20 defined by gland housing 18. Gland housing 18 can provide a bidirectional seal between an interior region 54 of the process vessel and a barrier fluid cavity 50. Barrier fluid cavity 50 is defined by gland housing 18, sealing element 38, balancing element 42, and adapter 46. Sealing element 38 can compensate for lateral movement of shaft 34, and/or for variations in shaft radius, by moving radially relative to axis 24 of seal 10. Thermal effects can cause axial expansion or contraction of sealing element 38 relative to gland housing 18, e.g. when sealing element 38 and gland housing 18 are made of materials with different coefficients of thermal expansion. Balancing element 42 can move axially to compensate for such thermal expansion or contraction of sealing element 38. Seal 10 can be configured such that axial movement of balancing element 42 maintains sealing contact between balancing element 42 and sealing element 38, e.g., while continuing to allow the radial movement of sealing element 38, as sealing element 38 expands and contracts.

As used herein, sealing contact is used to indicate proximity between two objects that limits the flow of a fluid between the objects. For example, two objects can be in sealing contact without touching each other (e.g., the two objects may be separated by a layer of lubricant or of the fluid whose flow is being limited). In another example, fluid may flow at a desired rate or seep between two objects in sealing contact.

As mentioned above, seal 10 is mounted to wall 30 of the process vessel by housing clamp 30. Bolts 58 inserted through bores 62 in housing clamp are threaded into mounting bores 66 machined into wall 30 of the process vessel. A counterbore region 70 machined into wall 30 of the process vessel receives a first end 78 of housing clamp 14. Engagement between counterbore region 70 and housing clamp 14 can help provide structural stability and can help set the position of seal 10 relative to an opening 74 in wall 30 through which shaft 34 extends. A second end 82 of housing clamp 14 includes a projection 86 that extends radially inward. Housing clamp 14 can be formed (e.g., machined) out of durable, structurally stable materials such as stainless steels and other metals and alloys.

Gland housing 18 includes a first portion 114 adjacent to wall 30 of the process vessel, a second portion 118 spaced apart from the process vessel, and a middle portion 122 between first portion 114 and second portion 118. The circumference of the inner surface of first portion 114 of gland housing 18 is greater than the circumference of the inner surface of middle portion 122 of gland housing 18. The circumference of the inner surface of middle portion 122 of gland housing 18 is greater than the circumference of the inner surface of the second portion 118 of gland housing 18. In effect, gland housing 18 and wall 30 of the process vessel define a recess adjacent wall 30 of the process vessel and gland housing 18 includes an inwardly extending projection formed by the second portion 118 of gland housing 18. A dovetail recess 124 is formed at the corner of gland housing 18 between the inner surface of gland housing 18 and the radially extending end surface of gland housing 18.

Gland housing 18 defines a hole or channel 92 extending from a port 96 in the outer surface of gland housing 18 to an opening 100. Channel 92 and port 96 provide fluid communication from the outer surface of gland housing to interior cavity 20 defined by gland housing 18. Channel 92 and port 96 are noted using dashed lines because they are offset from the plane of the cross-section. In this embodiment, channel 92 and port 96 are defined by second portion 118 of gland housing 18. Channel 92 extends axially from port 96 to a radially extending surface 126 of gland housing 18. Gland housing 18 can be formed (e.g., machined) out of durable structurally stable materials such as stainless steels and other metals and alloys. Gland housing 18 also defines a recess 128 in radially extending surface 126 of gland housing 18. A seal (e.g., an o-ring 146) disposed in recess 128 engages gland housing 18 and sealing element 38. O-ring 146 provides sealing contact to limit (e.g., prevent) flow of barrier fluid from barrier fluid cavity to the atmosphere.

A groove 90 machined in the outer surface of gland housing 18 receives projection 86 of housing clamp 14. Engagement between groove 90 of gland housing 18 and projection 86 of housing clamp 14 sets the position of gland housing 18. Housing clamp 14 compresses gland housing 18 against wall 30 of the process vessel such that movement of gland housing 18 is limited (e.g., prevented) under normal operating conditions. In this embodiment, groove 90 is defined by middle portion 122 of gland housing 18.

A threaded bore 102 and counter-bore 106 are formed extending from the exterior surface to the interior surface of gland housing 18. A pin 110 threaded into and through bore 102 extends into the interior cavity 20 of gland housing 18. In this embodiment, bore 102 and counter-bore 106 are defined by middle portion 122 of gland housing 18. Adapter 46 includes a first portion 130 adjacent wall 30 of the process vessel and a second portion 134 spaced apart from wall 30 of the process vessel. The circumference of the inner surface of first portion 130 of adapter 46 is less than the circumference of the inner surface of second portion 134 of adapter 46. In effect, first portion 130 of adapter 46 extends radially inward relative to second portion 134 of adapter 46. The circumference of the outer surface of first portion 130 of adapter 46 is slightly less than the circumference of the inner surface of first portion 114 of gland housing 18, the circumference of the outer surface of second portion 134 of adapter 46 is slightly less than the circumference of the inner surface of middle portion 122 of gland housing 18, and the axial extent of first portion 130 of adapter 46 matches the axial extent of first portion 114 of gland seal 18 such that adapter 46 nests within gland seal 18. Adapter 46 can be formed (e.g., molded or machined) of a non-corrosive material such as, for example, a fluoropolymer (e.g., Teflon™) or a thermoplastic. A groove 138 defined in the outer surface of first portion 130 of adapter 46 is sized to receive a seal (e.g., o-ring 146). Recess 138 is located opposite dovetail recess 124 in gland housing 18 and opens both outward towards gland housing 18 and laterally towards wall 30 of the process vessel. An o-ring 146 disposed in recess 138 engages both wall 30 and the inner surface of gland housing 18 as well as adapter 46. Some embodiments may be implemented with seals other than o-rings (e.g., gaskets or injected moldable compounds).

A circumferential groove 142 is also defined in the outer surface of adapter 46. Groove 142 is aligned with pairs of holes (not shown) extending through gland housing 18 (e.g., disposed extending parallel to a line tangent to the outer surface of gland housing 18 and extending across a small arc (5-10 degrees) of the circumference of the outer surface of adapter 46). Pins 148 inserted through the holes (not shown) in gland housing engage groove 142 to maintain the position of adapter 46 relative to gland housing 18.

Another recess 150 sized to receive a seal is defined in the outer surface of second portion 134 of adapter 46. Another o-ring 146 disposed in recess 150 engages the inner surface of gland housing 18 and adapter 46. Recess 150 is in fluid communication with barrier fluid cavity 50 (e.g., through gaps between the inner surface of gland housing 18 and the outer surfaces of adapter 46 and balancing element 42). Thus, barrier fluid pressure is applied to the right or "barrier" side of o-ring 146 in recess 150. [As used herein, "right" and "left" indicate directions with respect to the drawing being discussed and are used for ease of description rather than to imply any absolute orientation.]

Balancing element 42 includes a first portion 154, a second portion 158, and a middle portion 162. The circumferences of the outer surfaces of first portion 154, second portion 158, and middle portion 162 of balancing element 42 are, respectively, slightly less than the circumferences of the inner surfaces of first portion 130 of adapter 46, middle portion 122 of gland housing 18, and second portion 134 of adapter 46 such that balancing element 42 can nest within adapter 46 and gland housing 18. Balancing element 42 can move axially relative to adapter 46 and gland housing 18. Balancing element 42 can be formed (e.g., molded or machined) of a non-corrosive material such as, for example, a fluoropolymer.

A biasing member or members (e.g., resilient coil springs 174) is/are positioned between adapter 46 and balancing element 42. Coil springs 174 are received within bores 178 defined extending axially within second portion 158 of balancing element 42. Coil spring 172 engages a flat, radially-extending end surface of adapter 46. Coil springs 174 are sized and configured such that, when seal 10 is assembled, coil springs 174 are compressed and biases adapter 46 and balancing element 42 away from each other. Because adapter 46 is fixed in position, coil springs 174 bias balancing element 42 towards sealing element 38. As described in more detail below, the adapter-spring-balancing element combination compensates for the differential thermal expansion of sealing element 38 relative to gland housing 18 and can maintain the engagement between seal components at a level sufficient to provide sealing contact while permitting radial motion of the sealing element 38. Some seal embodiments may be implemented using biasing or resilient members other than coil springs.

The outer surface of balancing element 42 extends radially outward between the portions 154 and 162, as well as between portions 162 and 158, of balancing element 42. Engagement between the radially extending end surface of adapter 46 and the radially extending outer surface of balancing element 42 between second portion 158 and middle portion 162 of balancing element 42 limits axial movement of balancing element 42 towards wall 30 of the process vessel. The axial extent of first portion 154 of balancing element 42 and the axial extent of second portion 134 of adapter 46 are both greater than the axial extent of middle portion 162 of balancing element 42. Thus, the outer surface of balancing element 42 and the inner surface of adapter 46 define a seal cavity 166.

A seal (e.g., o-ring 146) disposed in seal cavity 166 engages the outer surface of balancing element 42 and the inner surface of adapter 46. Seal cavity 166 is in fluid communication with barrier fluid cavity 50 and interior region 54 of the process vessel. Thus, barrier fluid pressure is applied to the right or barrier side of o-ring 146 and reaction fluid pressure is applied to the left or process side of o-ring 146.

A recess 170 is defined in the end surface of second portion 158 of balancing element 42. Recess 170 is positioned slightly farther outward than the outer circumference of first portion 154 of balancing element 42. A seal (e.g., o-ring 146) disposed in recess 170 engages balancing element 42 and sealing element 38. Recess 170 can be in fluid communication with barrier fluid cavity 50 and interior region 54 of the process vessel. Some seal embodiments are implemented with other seals (e.g., opposed lip seals extending from balancing element 42) rather than the recess/o-ring combination.

The end surface of second portion 158 of balancing element 42 is curved/slanted such that the axial extent of second portion 158 adjacent recess 170 is greater than the axial extent of second portion 158 at the inner and outer surfaces of balancing element 42. This configuration can reduce the contact area, and thus friction, between balancing element 42 and sealing element 38 as well as allow for some degree of angular motion of sealing element 38.

Similarly, the inner surface of balancing element 42 includes a slanted (rather than radially extending) face at the transition between first portion 154 and middle portion 162 of balancing element 42. The slanted face provides clearance for seal sleeve 26 relative to first portion 154 of balancing element 42, the thickness of which provides structural stability.

Sealing element 38 includes an axially extending body 182 supporting lips seals 186 and bearing projections 190 extending inwardly from body 182. Circumferential lip seals 186 and bearing projections 190 are integrally formed with body 182. (As used herein, "integrally formed with" is used to indicate components that are parts of a unitary whole as opposed to components that are attached to each other (e.g., by adhesive, mechanical joints, solder).) Sealing elements with integral lip seals can provide increased ease of manufacture and assembly, increased reliability, smaller size, and lower costs due to fewer parts relative to sealing elements with discrete lips seals attached to a separate body.

Sealing element 38 can be formed (e.g., molded or machined) of a resilient non-corrosive material with good sealing characteristics (e.g., a fluoropolymer or rubber) with circumferential lip seals 186 extending inwardly from body 182 farther than bearing projections 190 extend inwardly. When seal 10 is assembled, engagement with seal sleeve 26 inclines lip seals 186 towards body 182 of sealing element 38. Lips seals 186 are formed of a resilient material and the bias of lip seals 186 towards their original orientations acts to maintain engagement between lip seals 186 and seal sleeve 26. When sealing element 182 is not moving (e.g., when shaft 34 is centered), bearing projections 190 are slightly spaced apart from seal sleeve 26.

The pair of lips seals 186a closest to adapter 42 is bracketed by a pair of bearing projections 190 that define a recess 194 in fluid communication with interior region 54 of the process vessel. Lip seals 186 of lip seal pair 186a, disposed with ends oriented towards balancing element 42, are activated by presence of a pressurizing fluid on the side away from the other lip seal pairs 186b and 186c, i.e. the process side. Two other pairs of lip seals 186b and 186c are bracketed by a pair of bearing projections 190 that define a recess 198. Lip seals of lip seal pair 186b are disposed with their ends oriented towards, i.e. opposing, lip seal pair 186c, and lip seals of lip seal pair 186c are disposed with their ends oriented towards, i.e. opposing, lip seal pair 186b. Lip seals of lip seal pairs 186b and 186c are activated by presence of a pressurizing fluid applied between them. A channel (not shown) extending from the outer surface to the inner surface of sealing element 38 provides fluid communication between barrier fluid cavity 50 and recess 198 and opens into recess 198 between lip seal pair 186b and lip seal pair 186c. The multiple lip seal pairs 186a, 186b, and 186c can provide bi-directional sealing as discussed in more detail below.

A pin 110 is threaded into and through gland housing 18 into a bore 200 defined in the outer surface of sealing element 38. Pin 110 prevents rotation of sealing element 38 relative to gland housing 18. However, bore 200 has sufficient radial extent to allow for radial movement of sealing element 38 relative to gland housing 18.

As discussed above, seal sleeve 26 is held in place on shaft 34 by lock ring 22. Seal sleeve 26 includes a projection 202 extending radially outward to engage a mating recess 206 in lock ring 22. Two recesses 210 defined in the inner surface of seal sleeve 26 receive seals (e.g., o-rings 146). Recesses 210 are positioned such that o-rings engage the surface of shaft 34 at two outwardly projections to provide a seal between shaft 34 and seal 10. The end of seal sleeve 26 opposite projection 202 is formed (e.g., molded or machined) to have a two-stage beveled surface. The two stage beveled surface includes a first beveled surface 212 disposed between the radially extending end surface 214 of seal sleeve 26 and a second beveled surface 216. Second beveled surface 216 is disposed between first beveled surface 212 and an axially extending outer surface 218 of seal sleeve 26. First beveled surface 212 extends at an angle $\alpha_1$ between 155 and 165 degrees relative to axially extending outer surface 218 of seal sleeve 26 and second beveled surface 216 extends at an angle $\alpha_2$ between 165 and 175 degrees relative to axially extending outer surface 218 of seal sleeve 26. Seal sleeve 26 can be formed (e.g., molded, machined) of a durable material such as, for example, a ceramic or metal with an oxide coating, e.g., chromium or other suitable material.

During assembly, gland housing 18 can be oriented with second portion 118 of gland housing 18 at the bottom such that gravity will help hold the various components in place. O-rings 146 can be installed as the various components are being assembled.

Seal 10 can be assembled by inserting sealing element 38 into interior cavity 20 defined by gland housing 18. Bore 200 in sealing element can then be aligned with bore 102 in gland housing and pin 110 threaded into bore 102 to extend into bore 200. Balancing element can then be inserted into cavity 20 to rest on sealing element 38. Springs 174 can then be placed in bores 178 in balancing element 42. Adapter 46 can then be placed into cavity 20 to rest on springs 174 and/or balancing element 42. Adapter 46 is then pressed towards sealing element 38 (compressing springs 174) until pins 148 can be inserted through the holes (not shown) in gland housing to engage groove 142 to maintain the position of adapter 46 relative to gland housing 18. The two halves of housing clamp 14 are then placed in engagement with gland housing 18 and the assembled components are bolted to wall 30 of the process vessel. Bolts 58 are tightened such that housing clamp 14 compresses gland housing 18 against wall 30 of the process vessel. Seal sleeve 26 can be placed in position on shaft 34 before the two halves of lock ring 22 are bolted together to hold seal sleeve 26 in position.

The shaft-seal sleeve-lock ring assembly can be inserted into engagement with sealing element 38 before or after the other components are attached to wall 30 of the process vessel. The orientation of lip seal pairs 186a and 186c aids insertion of the shaft-seal sleeve-lock ring assembly because it is desired that these lip seal pairs 186a and 186c bend in the direction towards which force associated with the insertion process is applied. However, particular care must be taken as the chamfered end of seal sleeve 26 is inserted past lip seals 186b because it is desired that the lip seals of lip seal pair 186b bend in the direction against which force associated with the insertion process is applied. The lip seals of lip seal pair 186b are formed extending inwardly with a discrete bend towards the lip seals of lip seal pair 186c. As the shaft-seal sleeve-lock ring assembly is inserted, a first beveled surface 212 of the two stage beveled surface engages the ends of the lip seals of lip seal pair 186b and starts to bend them from their rest position towards the direction from which the seal sleeve 26 is being inserted (i.e. the barrier side). As engagement between the lip seals of lip seal pair 186b and two stage beveled surface moves to second beveled surface 216, the lip seals are positioned in their "deflected" positions.

FIGS. 2A and 2B together illustrate the bidirectional sealing provided by seal 10. In use, port 96 of gland housing 18 is connected with a source of a pressurized barrier fluid. The barrier fluid fills barrier fluid cavity 50 and flows into seal cavity 166 (between balancing element 42 and adapter 46) as well as recess 198 in sealing element 38. The barrier fluid applies an inward (or barrier side) force to sealing element 38 that helps maintain sealing contact between sealing element 38 and seal sleeve 26.

When the barrier fluid pressure is greater than the process pressure, there exists a positive pressure differential, and o-ring 146 in seal cavity 166 is urged towards the process side (leftwards in the drawing) as shown in FIG. 2A. The barrier fluid and process fluid are both present on both ends of balancing element 42. However, as discussed above, recess 170 is positioned at a slightly greater distance from the axis than the outer circumference of first portion 154 of balancing element 42. Thus, the barrier fluid pressure is applied to an area on the process (left hand) side of balancing element 42 that is larger than the area on the barrier (right hand) side of balancing element 42, and this positive pressure differential across the balancing element 42 of the barrier fluid pressure being relatively greater than the process fluid pressure urges the balancing element 42 towards sealing element 38.

When the process pressure is relatively greater than the barrier fluid pressure (i.e. a negative pressure differential), O-ring 146 in seal cavity 166 is urged towards the barrier side (rightwards in the drawing) into sealing contact with balancing element 42 as shown in FIG. 2C. Thus, the process fluid pressure is applied to an area on the process (left hand) side of balancing element 42 that is relatively larger than the area on the barrier (right hand) side of balancing element 42. The negative pressure differential across the balancing element 42 of the barrier fluid pressure being relatively less than the process fluid pressure still urges the balancing element 42 towards sealing element 38.

Thus, the axial force on balancing element 42 is primarily due to springs 174 which are been configured to maintain the engagement of the seals between sealing element 38 and both balancing element 42 and gland housing 18 at a level sufficient to provide sealing contact while allowing radial motion of sealing element 38.

The barrier fluid present between lip seal pair 186b and lip seal pair 186c activates these seals. If the barrier fluid was in contact with lip seal pair 186a when barrier fluid pressure is greater than process pressure (i.e. a positive pressure differential), the lip seals of lip seal pair 186a would be inoperative. However, lip seal pair 186b separates lip seal pair 186a from the barrier fluid. When the process pressure is greater than the barrier fluid pressure (i.e. a negative pressure differential), the primary seal between sealing element 38 in seal sleeve 26 is provided by the lip seals of lip seal pair 186a which are activated by the process fluid pressure.

Figure 3A:
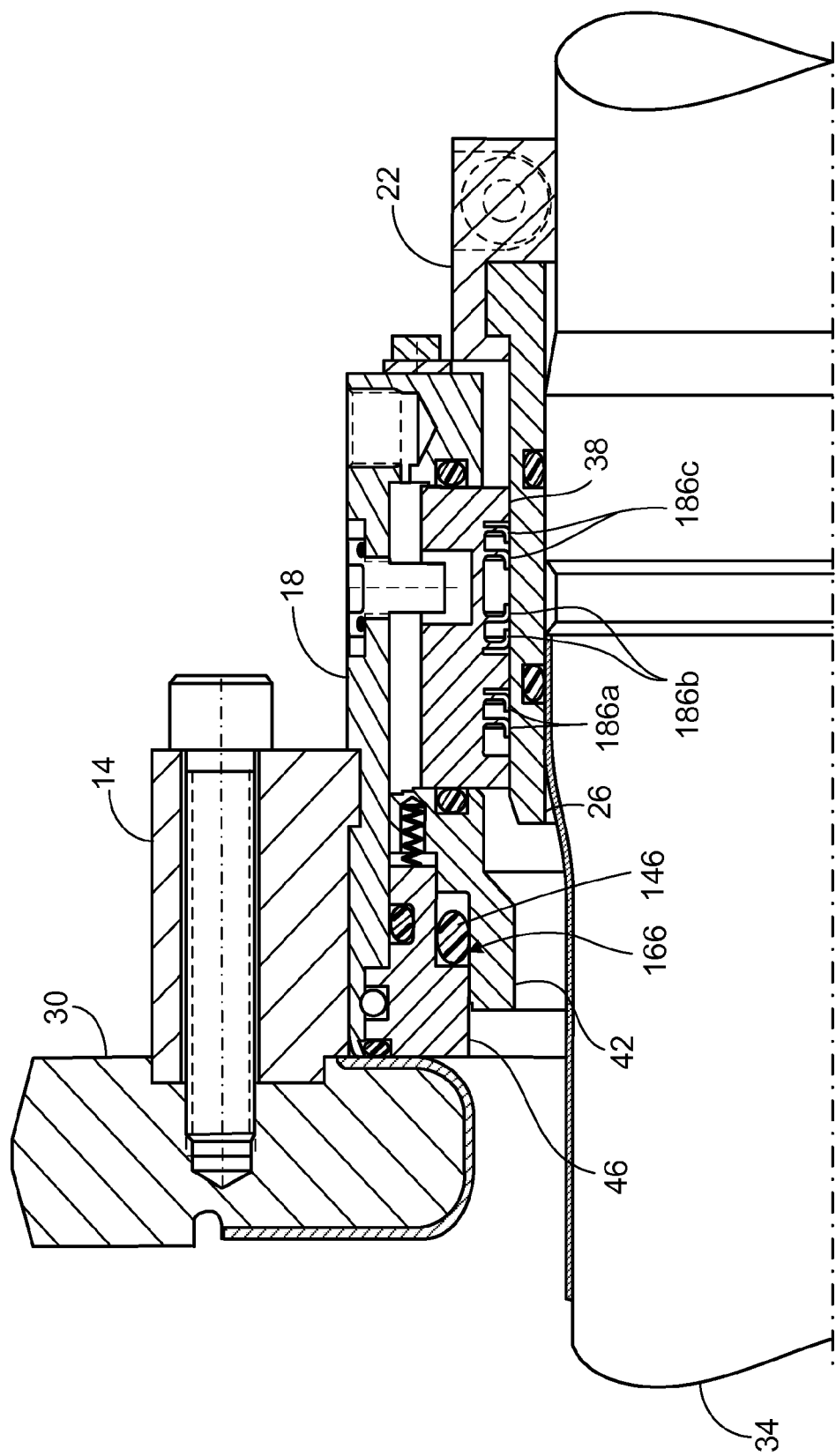
FIGS. 3A and 3B are cross-sectional views of the seal of FIG. 1 illustrating seal compensation for radial motion of the shaft.
Figure 3B:
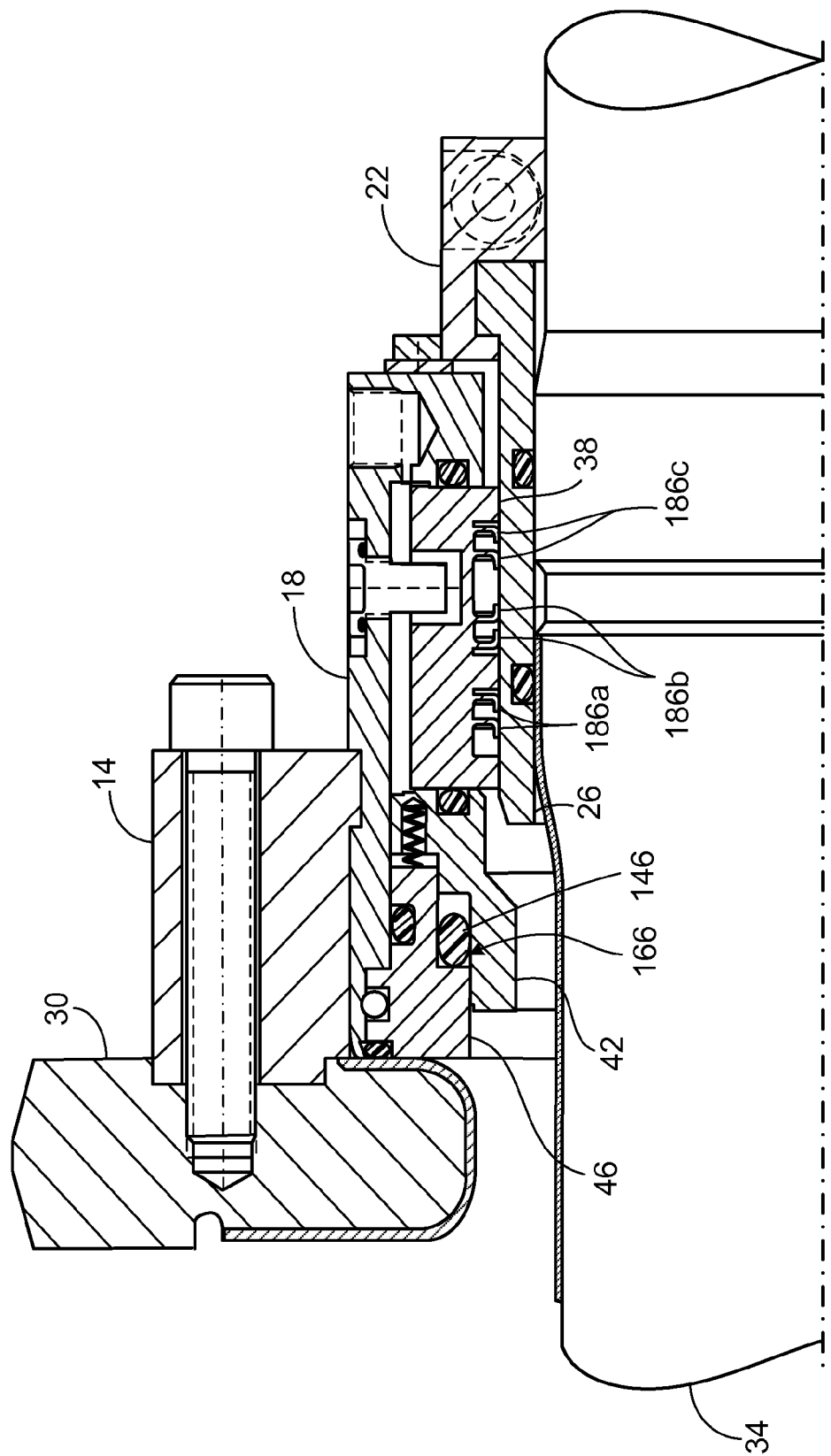

FIGS. 3A and 3B together illustrate the operation of seal 10 to compensate for radial motion of shaft 34. FIG. 3A shows the position of sealing element 38 when shaft 34 is off-center relative to seal 10 (downwards relative to the portion of the seal shown). Before radial motion of shaft 34, lips seals 186 are in effective contact with seal sleeve 26 but bearing projections are spaced apart from seal sleeve 22. As shaft 34 and seal sleeve 26 move radially, lip seals 186 bend, and seal sleeve 26 contacts bearing projections 190. Force applied by seal sleeve 26 to bearing projections 190 causes sealing element 38 to follow the radial motion with sealing element riding outward as shown in FIG. 3B. Without projections 190, lip seals 186 would be deflected further to compensate for radial motion of shaft 34. Projections 190 can limit the amount that lip seals 186 bend such that lip seals 186 remain within their elastic range of deformation.

Figure 4A:
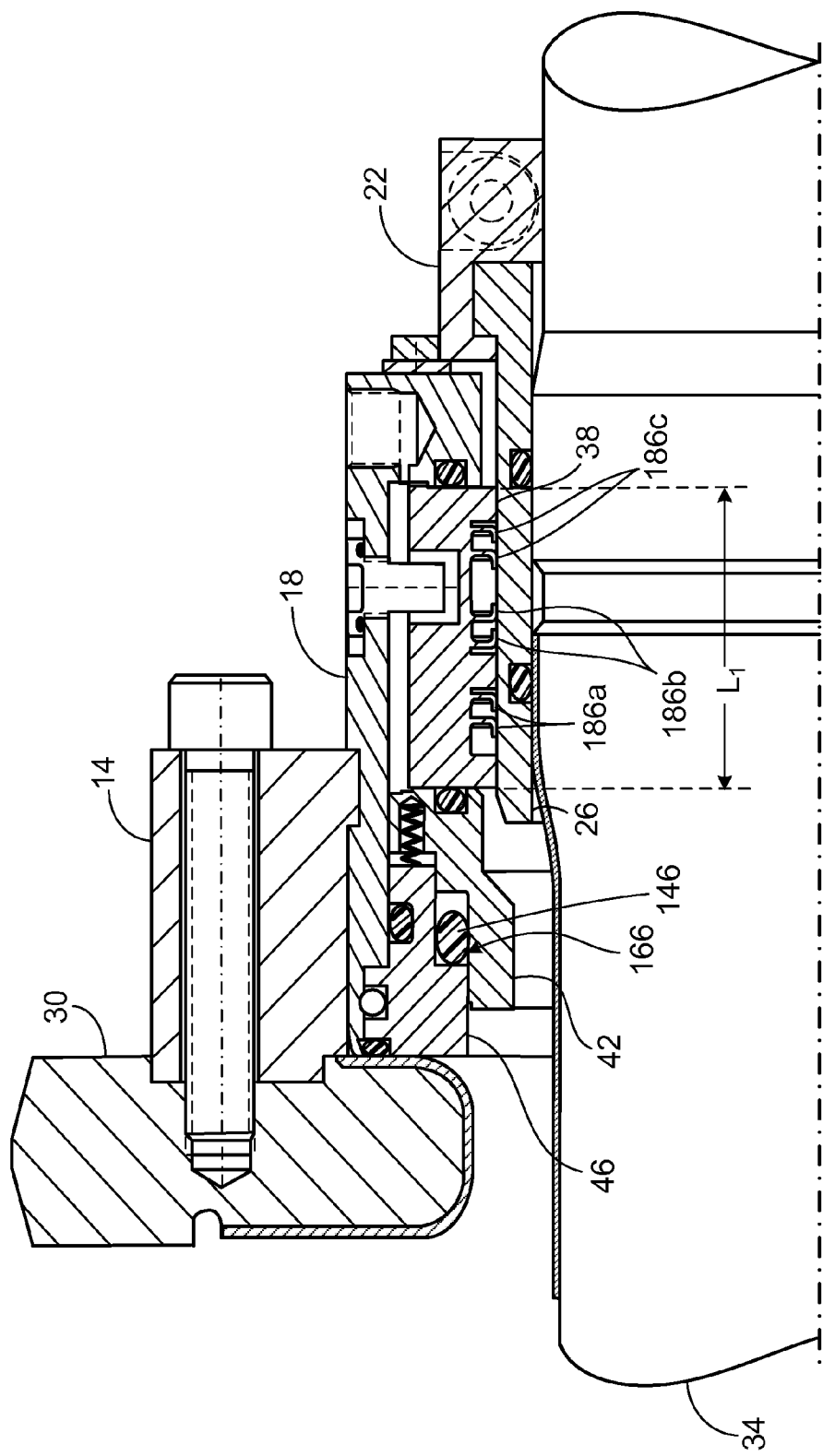
FIGS. 4A and 4B are cross-sectional views of the seal of FIG. 1 illustrating seal compensation for thermal effects on seal components.
Figure 4B:
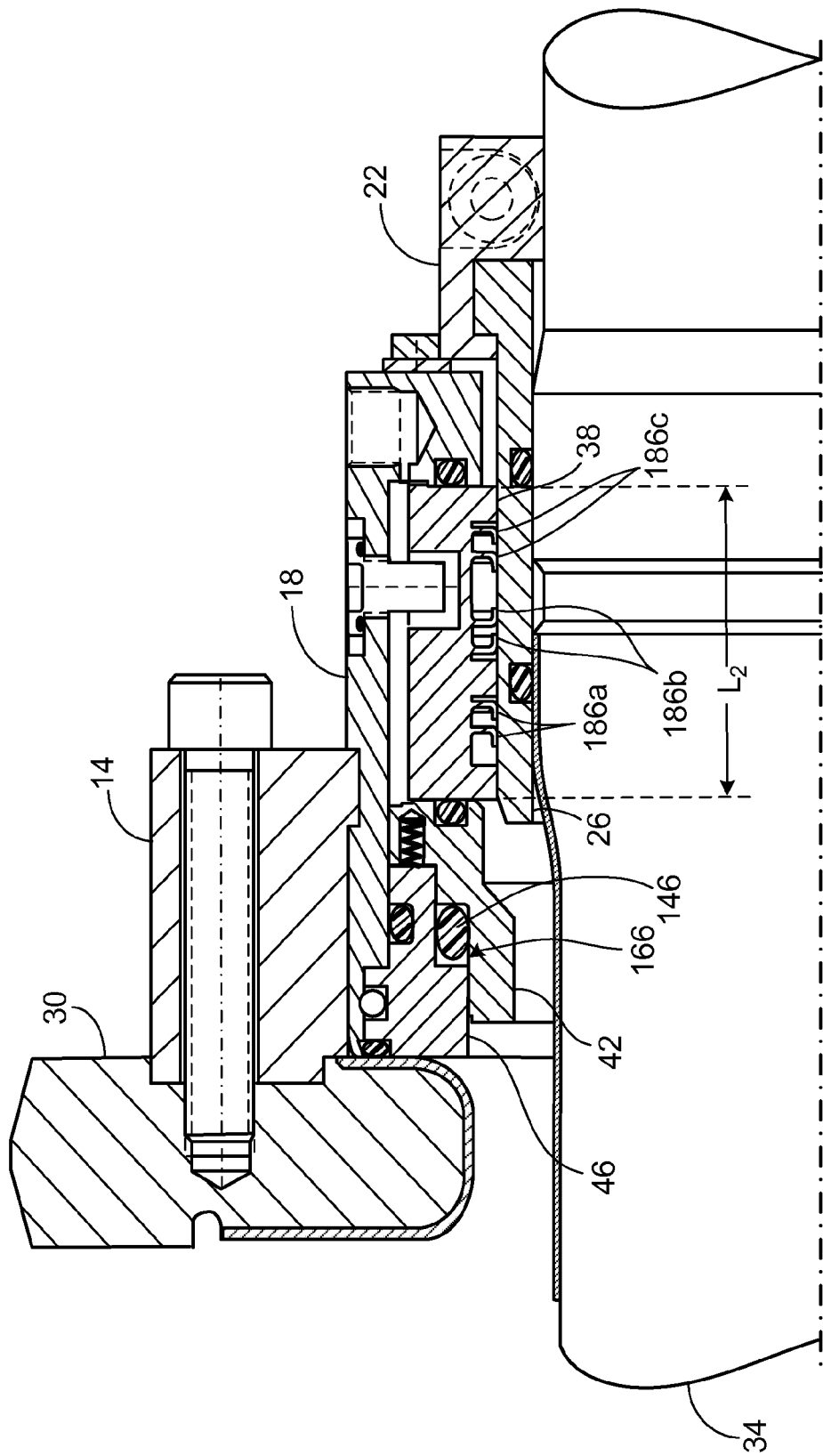

FIGS. 4A and 4B together illustrate the operation of seal 10 to compensate for thermal effects on sealing element 38. The compensation for radial motion of shaft 34 described above with reference to FIGS. 3A and 3B is enabled in part by maintenance of a specific degree of engagement between the seal components, such that the engagement is sufficient to provide sealing between sealing element 38 and adjacent components, and yet less than the amount of engagement that would fix sealing element 38 in place and restrict radial motion. It is desirable to form sealing element 38 with integral lip seals 186 of a resilient non-corrosive material (e.g., a fluoropolymer or rubber). It is desirable to form the seal housing (e.g., housing clamp 14 and gland seal 18) from durable, structurally stable materials (e.g., stainless steel). However, sealing elements 38 formed of material appropriate to make integral lip seals 186 can exhibit differential thermal expansion of sealing element 38 relative to gland housing 18. Due to the elongated, narrow configuration of sealing element 38, such differential thermal effect are primarily exhibited as relative axial expansion and contraction. For example, sealing element 38 can have an initial length of $L_1$ as shaft 34 begins to rotate (see FIG. 4A). Heat caused by operation of the process vessel and shaft rotation can cause sealing element to axially expand to have a relatively greater length $L_2$ (see FIG. 4B). As this lengthening occurs, balancing element 42 moves axially in the process direction (leftwards in the drawings) to compensate. The axial movement of balancing element 42 can maintain sufficient engagement to provide sealing contact between sealing element 38 and adjacent components while still allowing radial motion of sealing element 38 to compensate for radial motion of shaft 34.

A number of embodiments of the invention have been described. Nevertheless, it will be understood that various modifications may be made without departing from the spirit and scope of the invention. For example, in some embodiments, adapter 46 is integrally formed as part of gland housing 18 rather than being a separate element of the seal 10. In another example, seals as shown can be used in other applications including, e.g., for sealing of reaction vessels, mixing vessels, pumps, etc. In another example, in some embodiments, other resilient members (e.g., belleville washers, wave springs, etc) can be used in place of the springs 174/bores 178 combination to bias balancing element 42 towards sealing element 38.

Accordingly, other embodiments are within the scope of the following claims.

What is claimed is:

1. A seal assembly configured to extend circumferentially about a shaft, the seal assembly comprising:
   a housing defining an interior cavity open towards a central axis of the seal assembly;
   a sealing element configured to move radially within the interior cavity in a manner to maintain sealing contact, the sealing element disposed within the interior cavity of the housing;
   a first seal disposed in contact with and between the sealing element and the housing, the first seal maintaining sealing contact to limit fluid flow between the sealing element and the housing;
   a first element configured to move axially within the interior cavity in a manner to maintain sealing contact, the first element disposed within the interior cavity of the housing;
   a second seal disposed between the first element and the sealing element, the second seal maintaining sealing contact to limit fluid flow between the sealing element and the first element during radial motion of the sealing element relative to the first element;
   a spring disposed in contact with the first element, the spring configured to bias the first element towards sealing contact with the sealing element such that first element and the second seal maintain sealing contact during axial movement of an end face of the sealing element; and
   a third seal disposed between the first element and the housing, the third seal maintaining sealing contact to limit fluid flow between the housing and the first element.

2. The seal assembly of claim 1, further comprising a second element disposed between the first element and the housing and the third seal is disposed in a third seal cavity mutually defined by the first element and the second element.

3. The seal assembly of claim 2, wherein the third seal is disposed to limit fluid flow between a first portion of the cavity in fluid communication with a first fluid reservoir at a first pressure and a second portion of the cavity in fluid communication with a second fluid reservoir at a second pressure.

4. The seal assembly of claim 3, wherein a pressure differential between the first pressure and the second pressure, taken across the third seal, biases the first element towards the sealing element when the first pressure is relatively greater and biases the first element towards the sealing element when the second pressure is relatively greater.

5. The seal assembly of claim 3, wherein the third seal is operable to move axially in the third seal cavity in response to a pressure differential between the first pressure and the second pressure.

6. The seal assembly of claim 5, wherein the third seal is operable to move axially in the third seal cavity in response to the pressure differential, the third seal being urged toward a first position when the first pressure is relatively greater and toward a second position when the first pressure is relatively less.

7. The seal assembly of claim 5, wherein the third seal comprises an o-ring.

8. The seal assembly of claim 1, wherein the sealing element comprises:
   a sealing element body;
   a plurality of first land protrusions integrally formed with and extending from the sealing element body; and
   a plurality of second lip protrusions integrally formed with and extending from the sealing element body;
   wherein the second lip protrusions are biased towards a position in which the second lip protrusions extend relatively further from the body than the first land protrusions.

9. The assembly seal of claim 8, wherein each second protrusion defines a resilient ridge positioned for deflection by contact with an annular member inserted into the sealing member.

10. The assembly seal of claim 9, wherein the second lip protrusions are arranged in pairs with a first pair of the second lip protrusions having tips deflected towards a second pair of the second lip protrusions, the second pair of protrusions having tips deflected towards the first pair of the second lip protrusions, and a third pair of second lip protrusions having tips deflected away from the first pair and second pair of second lip protrusions.

11. The assembly seal of claim 9, wherein a first end of the annular member defines a first beveled surface disposed between a radially extending end surface of the annular member and a second beveled surface, the second beveled surface disposed between the first beveled surface and an axially extending outer surface of the annular member.

12. The seal assembly of claim 11, wherein the first beveled surface extends at an angle between 155 and 165 degrees relative to the axially extending outer surface of the annular member and the second beveled surface extends at an angle between 165 and 175 degrees relative to the axially extending outer surface of the annular member.

13. The seal assembly of claim 8, wherein the first land protrusions are relatively less flexible than the second lip protrusions.

14. The seal assembly of claim 1, further comprising a pin extending from the housing into a bore defined in the sealing element to limit rotation of the sealing element relative to the housing while allowing radial motion of the sealing element within the housing.

15. The seal assembly of claim 1, wherein the seal comprises a split seal.

* * * * *

UNITED STATES PATENT AND TRADEMARK OFFICE
CERTIFICATE OF CORRECTION

PATENT NO. : 8,720,899 B2  
APPLICATION NO. : 13/335235  
DATED : May 13, 2014  
INVENTOR(S) : Henri Azibert et al.

Page 1 of 1

It is certified that error appears in the above-identified patent and that said Letters Patent is hereby corrected as shown below:

In the Claims

Col. 12, line 34, claim 9, delete "assembly seal" and insert -- seal assembly --, therefor.

Col. 12, line 38, claim 10, delete "assemblyseal" and insert -- seal assembly --, therefor.

Col. 12, line 46, claim 11, delete "assemblyseal" and insert -- seal assembly --, therefor.

Signed and Sealed this  
Sixteenth Day of September, 2014

Michelle K. Lee  
*Deputy Director of the United States Patent and Trademark Office*